(12) United States Patent
Chu

(10) Patent No.: US 10,184,435 B2
(45) Date of Patent: Jan. 22, 2019

(54) FUEL INJECTION UNIT FOR INTERNAL COMBUSTION ENGINE

(71) Applicants: HYUNDAI MOTOR COMPANY, Seoul (KR); KIA Motors Corporation, Seoul (KR)

(72) Inventor: Dong Ho Chu, Ansan-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 15/362,348

(22) Filed: Nov. 28, 2016

(65) Prior Publication Data
US 2017/0306902 A1 Oct. 26, 2017

(30) Foreign Application Priority Data
Apr. 20, 2016 (KR) .................. 10-2016-0048199

(51) Int. Cl.
*F02M 69/04* (2006.01)
*F02M 35/10* (2006.01)
*F02M 61/14* (2006.01)

(52) U.S. Cl.
CPC ............... *F02M 35/10262* (2013.01); *F02M 35/10177* (2013.01); *F02M 35/10216* (2013.01); *F02M 35/10281* (2013.01); *F02M 61/145* (2013.01)

(58) Field of Classification Search
CPC ....... F02M 35/10262; F02M 35/10281; F02M 35/10177; F02M 35/10216; F02M 61/145; F02M 69/046; F02F 1/4235; F02F 1/4242; F02F 1/425; F02B 31/00; F02B 31/04; F02D 41/3094

USPC ............... 123/302, 306, 308, 299, 300, 431
See application file for complete search history.

(56) References Cited

U.S. PATENT DOCUMENTS

| 6,575,133 B2* | 6/2003 | Ries-Mueller | F02B 77/082 123/306 |
| 6,848,436 B2* | 2/2005 | Oota | F01M 13/022 123/572 |
| 6,904,891 B2* | 6/2005 | Tominaga | F01L 3/06 123/302 |

(Continued)

FOREIGN PATENT DOCUMENTS

| JP | 2004-092487 A | 3/2004 |
| JP | 2005-113746 | 4/2005 |

(Continued)

OTHER PUBLICATIONS

Korean Office Action dated Jul. 25, 2017 form Korean Application No. 10-2016-0048199, 5 pp.

*Primary Examiner* — Hai H Huynh
(74) *Attorney, Agent, or Firm* — Brinks Gilson & Lione

(57) ABSTRACT

The present disclosure provides a fuel injection unit for an internal combustion engine. The fuel injection unit includes: a separator that is disposed in an intake port to supply air into a combustion chamber formed in an engine head, and that divides a channel for air into an upper channel and a lower channel; a blade disposed ahead of the separator and opening or closing the upper channel or the lower channel by rotating; and a first injector disposed over the intake port. In particular, when the first injector injects fuel, the blade does not interfere with the fuel.

9 Claims, 3 Drawing Sheets

(56) References Cited

U.S. PATENT DOCUMENTS

| | | | | |
|---|---|---|---|---|
| 6,918,372 B2* | 7/2005 | Nishii | ............ | F02B 31/08 123/302 |
| 7,051,702 B2* | 5/2006 | Sakai | ............ | F02B 23/08 123/188.14 |
| 7,128,050 B1* | 10/2006 | Abe | ............ | F02B 31/06 123/306 |
| 7,455,044 B2* | 11/2008 | Isaji | ............ | F02B 31/06 123/306 |
| 7,565,894 B2* | 7/2009 | Oda | ............ | F02B 31/085 123/308 |
| 7,802,555 B2* | 9/2010 | Maeda | ............ | F02B 23/104 123/306 |
| 7,856,958 B2* | 12/2010 | Tachibana | ............ | F02B 23/08 123/307 |
| 8,402,941 B2* | 3/2013 | Kobori | ............ | F02B 31/06 123/306 |
| 2010/0294228 A1* | 11/2010 | Kameda | ............ | F02B 31/08 123/184.56 |

FOREIGN PATENT DOCUMENTS

| | | | | |
|---|---|---|---|---|
| JP | 2006-070875 | | 3/2006 | |
| JP | 2007-16657 A | | 1/2007 | |
| JP | 2007-113482 | * | 5/2007 | ............ F02M 35/10 |
| JP | 2010-106686 A | | 5/2010 | |
| JP | 2010-133360 | | 6/2010 | |
| JP | 2011-220184 | | 11/2011 | |
| KR | 10-2004-0041308 A | | 5/2004 | |
| KR | 10-2004-0086798 | | 10/2004 | |
| KR | 10-2005-0113740 | | 12/2005 | |
| KR | 10-2009-0063912 A | | 6/2009 | |

\* cited by examiner

FIG. 1 "Prior Art"

FUEL INJECTION UNIT FOR INTERNAL COMBUSTION ENGINE

CROSS REFERENCE TO RELATED APPLICATION

The present application claims priority to and the benefit of Korean Patent Application No. 10-2016-0048199, filed Apr. 20, 2016, the entire contents of which are incorporated herein by reference.

FIELD

The present disclosure relates to a fuel injection unit for an internal combustion engine equipped with both Gasoline Direct Injection (GDI) and Multi-Point Injection (MPI) to improve fuel efficiency and reduce EM (Emission Material).

BACKGROUND

The statements in this section merely provide background information related to the present disclosure and may not constitute prior art.

GDI has begun to be developed with a rise in demand for developing a high-pressure injector and improving fuel efficiency. A GDI engine can remarkably improve fuel efficiency through a combustion system that can perform ultra-lean combustion of about 40:1 during a part load operation.

A GDI engine, as shown in FIG. 1, includes an intake port 12 for guiding intake air with a strong tumble into a combustion chamber 11 and an exhaust port 13 for exhausting combustion gas, wherein an injector 14 that directly injects fuel into the combustion chamber 11 is disposed at a side from the intake port 12 and a spark plug 11 that ignites the fuel injected from the injector 14 by producing a spark is disposed over the combustion chamber 11. In particular, a bowl 17 for enhancing flow of intake air is formed on the top of a piston 16.

Accordingly, intake air flowing into the bowl 17 through the intake port 12 is enhanced in flow while flowing on the wall of the bowl 17, and the fuel directly injected from the injector 14 hits the wall of the bowl 17 whereby it evaporates on a hot surface of the piston 16 and is mixed with the intake air upon evaporating due to the strong flow of the intake air in the bowl 17, thereby producing a stratified gas mixture. Although the gas mixture is in an ultra-lean state in the entire combustion chamber, a stratified condensed gas mixture is produced around the spark plug, and combustion occurs in this state.

As described above, the flow of the intake air is enhanced when the intake air hits the wall of the bowl 17 formed on the top of the piston 16 and the fuel injected from the injector 14 also hits the wall of the bowl 17. This area of the bowl 17 that the fuel hits is called a wall guide bowl.

We have discovered that since the fuel injected into the bowl evaporates while hitting the wall of the piston, it evaporates later than the fuel that does not hit the wall of the piston. Accordingly, the fuel that evaporates late takes part in combustion later, so it produces soot and increases hydrocarbon (HC) exhaust.

In particular, we have found that in cold start condition (e.g., when the piston is not heated), a larger amount of smoke is exhausted and the flow of the intake air is enhanced only through the intake port, so performance under full load is decreased by load on the intake port.

The foregoing is intended merely to aid the understanding of the background of the present disclosure, and is not intended to mean that the present disclosure falls within the purview of the related art that is already known to those skilled in the art.

SUMMARY

Accordingly, the present disclosure addresses the above problems occurring in the related art, and proposes a fuel injection unit for an internal combustion engine having both GDI and MPI types that can improve fuel efficiency and reduce EM by inhibiting fuel wall-wetting.

In one aspect of the present disclosure, there is provided a fuel injection unit for an internal combustion engine, the fuel injection unit including: a separator disposed in an intake port configured to supply air into a combustion chamber formed in an engine head, and configured to divide a channel for air into an upper channel and a lower channel; a blade disposed ahead of the separator and configured to open or close the upper channel or the lower channel by rotating; and a first injector disposed over the intake port, in which when the first injector injects fuel, the blade does not interfere with the fuel.

A rear end of the separator may be positioned behind an end of the first injector.

The separator and the blade may be formed in a single module.

The first injector may be disposed in the engine head.

A valve angle of the engine head is a predetermined value or less such that the first injector may be disposed in the intake port.

A second injector configured to inject fuel directly into the combustion chamber may be disposed under the intake port.

An avoiding groove may be formed at an end of the separator to avoid interference with the first injector when fuel is injected.

The first injector may be in a form of a combined multiple injectors that have smaller capacity than a capacity of the first injector in a form of a single injector.

A plurality of avoiding grooves may be formed at an end of the separator to avoid interference with the combined multiple first injectors when fuel is injected.

The blade may rotate about a rotary shaft and the rotary shaft may be connected to a driving unit and rotated by the driving unit.

According to the fuel injection unit for an internal combustion engine having the structure described above, it is possible to improve PN by using both MPI and GDI, and inhibit or prevent fuel wall-wetting, improve fuel efficiency, and reduce EM by modulating VCM (Variable Charge Motion) and VTS (Variable Tumble System) and positioning MPI behind VTS.

Further, an MPI+VTS+GDI system can be achieved in a compact structure, so design is less restricted, the operation speed is increased in comparison to the mechanical type by driving VCM with a motor, and combustion can be stably performed by mapping an engine with exact prediction of the point of time where tumble starts increasing.

Further, it is possible to reduce a loss of fuel and accurately control fuel according to the amount of air by using a plurality of MPI injectors having relative small capacity.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
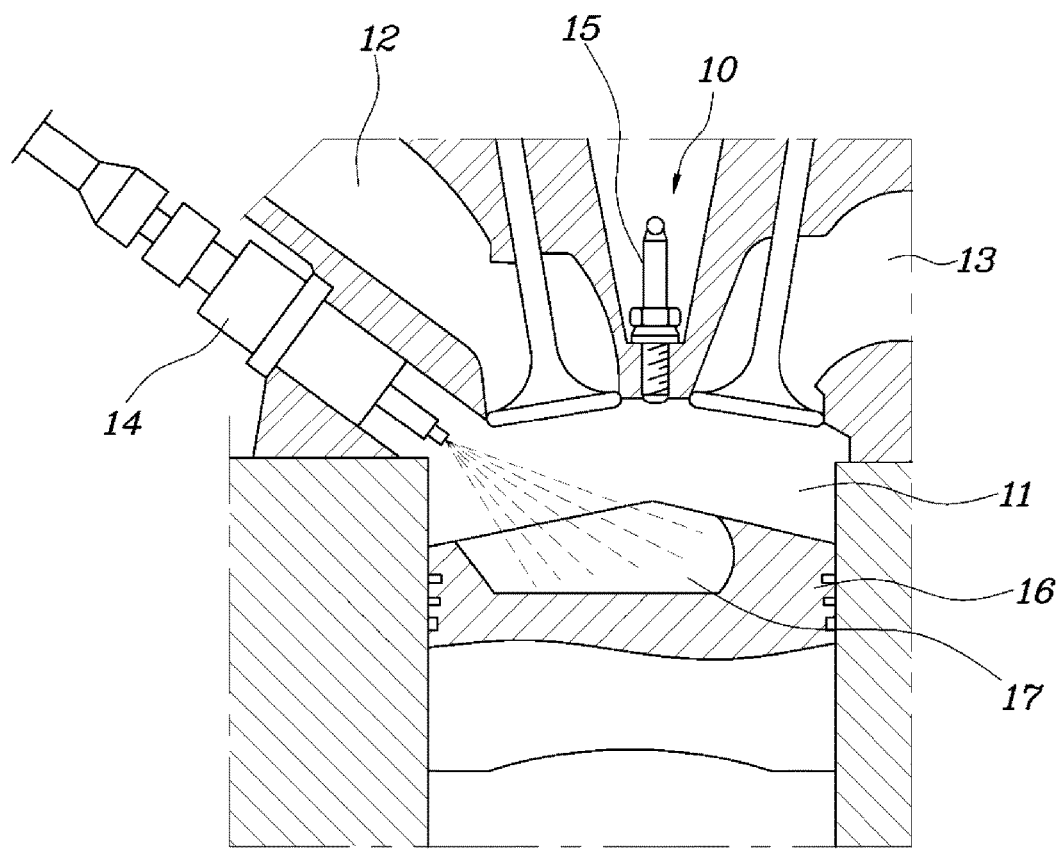
FIG. 1 is a view showing a fuel injection unit for an internal combustion engine of the related art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A fuel injection unit for an internal combustion engine according to one form of the present disclosure is described hereafter with reference to the accompanying drawings.

Figure 2:
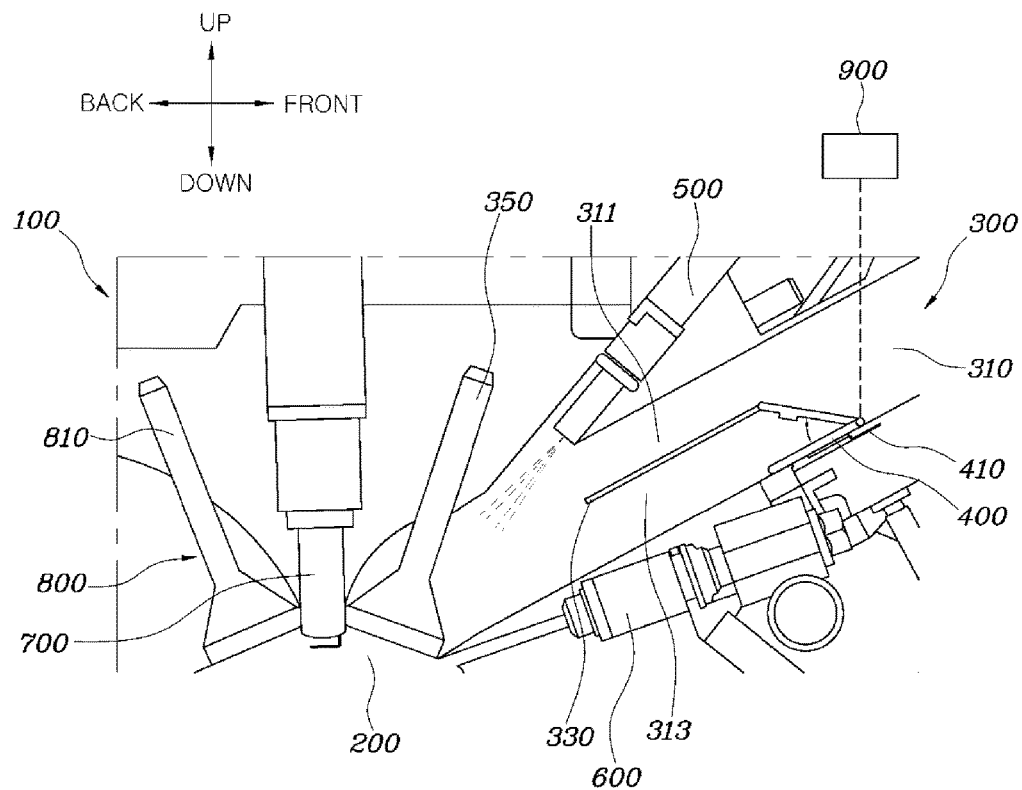
FIG. 2 is a view showing a fuel injection unit for an internal combustion engine.
Figure 3:
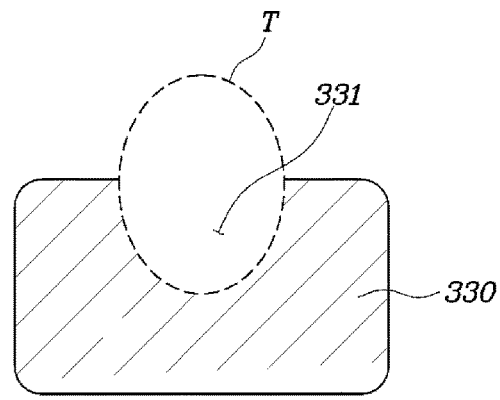
FIGS. 3 and 4 are views showing an avoiding groove formed in a separator.
Figure 4:
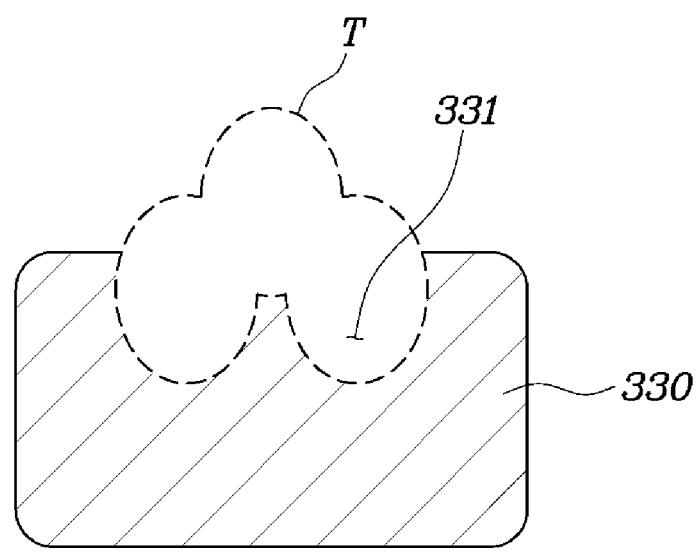

FIG. 2 is a view showing a fuel injection unit for an internal combustion engine according to one form of the present disclosure, and FIGS. 3 and 4 are views showing an avoiding groove 331 formed in a separator 330.

A fuel injection unit for an internal combustion engine includes: a separator 330 that is disposed in an intake port 300 supplying air into a combustion chamber 200 formed in an engine head 100 and divides a channel 310 for air into an upper channel 311 and a lower channel 313; a blade 400 that is disposed ahead of the separator 330 and opens or closes the upper channel 311 or the lower channel 313 by rotating; and a first injector 500 that is disposed over the intake port 300, in which when the first injector 500 injects fuel, the blade 400 does not interfere the fuel, thereby inhibiting or preventing wall-wetting.

An intake valve 350 and an exhaust valve 810 are provided for the combustion chamber 200 of the internal combustion engine, where the intake valve 350 is connected to the intake port 300 and the exhaust valve 810 is connected to the exhaust port 800. Air flowing inside through an air cleaner box (not shown), a serge tank (not shown), and a throttle valve (not shown) from the outside of a vehicle is supplied into the combustion chamber 200, and the air supplied in the combustion chamber 200 is mixed with fuel injected from the injectors 500 and 600 and then ignited and burned by a spark plug 700 at the center of the combustion chamber 200.

The separator 330 and the blade 400 in the intake port 300 guiding the intake air into the combustion chamber 200 enhance tumble for more efficient mixing of air and fuel for combustion.

The separator 330 is disposed in the intake port 300 and divides the channel 310 for air into the upper channel 311 and the lower channel 313 with the separator 330 therebetween. The rear end of the separator 330 is positioned behind the end of the first injector 500, so when the first injector 500 injects fuel, wall-wetting due to interference with the separator 330 is inhibited or prevented.

Further, the blade 400 that can rotate about a rotary shaft 410 is positioned ahead of the separator 330, so it guides air by opening or closing the lower channel 313. In particular, when the blade 400 blocks the lower channel 313, all the intake air flows into the combustion chamber 200 through the upper channel 311, so tumble is enhanced. The blade 400 rotates about the rotary shaft 410 and the rotary shaft 410 is connected to an individual driving unit 900 and is rotated by the driving unit 900. The driving unit 900 may be a motor. As described above, since the blade 400 is operated by the driving unit 900, the operation speed can be increased in comparison to the mechanical type of the related art. Further, the engine is mapped with exact prediction of the point of time where tumble starts increasing, so combustion can be more stably performed. Further, it may be possible to increase efficiency by forming the separator 330 and the blade 400 in a single mode and simultaneously using the separator 330 and the blade 400.

The first injector 500 is disposed in the engine head 100. However, when the valve angle of the engine head 100 is a predetermined value or less, the first injector 500 is positioned in the intake port 300 and injects fuel to the air so that the air and the fuel can be efficiently mixed. Further, the second injector 600 that directly injects fuel into the combustion chamber 200 may be disposed under the intake port 300.

As shown in FIG. 3, an avoiding groove 331 that is larger than the boundary T of fuel is formed at an end of the separator 330 to avoid interference with the first injector 500 when fuel is injected. Accordingly, interference with the separator 330 does not occur when fuel is injected. Accordingly, the length of an intake manifold (not shown) of the engine head 100 can be decreased. That is, according to this structure, a compact structure can be achieved.

Further, as shown in FIG. 4, an avoiding groove 331 is formed at an end of the separator 330 to avoid interference with the first injector 500 when fuel is injected. In FIG. 4, unlike the configuration shown in FIG. 3, the first injector 500 may be composed of a plurality of first injectors 500 (e.g., a combined multiple injector type) that have smaller capacity than when the first injector 500 is a single injector 500 (i.e., a singly type injector), as in FIG. 3. A plurality of avoiding grooves 331 are formed at the end of the separator 330 to avoid interference with the plurality of first injectors 500 when fuel is injected. The avoiding grooves 331 may be larger than the fuel boundary T, which is formed when the first injectors 500 inject fuel, to inhibit or prevent the separator 330 from interfering with the injected fuel.

For example, when one second injector 600 and two first injectors 500 are provided, the first injectors 500 having smaller capacity are disposed in the intake port 300 to improve linearity of fuel in a low-speed period. When an engine is operated in a period where the RPM is very low, one of the first injectors 500 is operated, but in a period with medium RPM, one of the first injectors 500 and the second injector 600, or only the second injector 600 is operated. In particular, in early starting or idling, it is possible to accurately control fuel according to the amount of air, without a loss of fuel, by using the first injectors 500. The first injectors 500 both inject fuel to the intake port 300 and may be mounted in the engine head 100 or the intake manifold.

The present disclosure can be applied to a system having both MPI and GDI types, and particularly, and to the intake port 300 and the engine head 100 where a VTS (Variable Tumble System) is applied. The first injector 500, second injector 600, separator 330, and blade 400 may be for MPI, GDI, VTS, and VCM (Variable Charge Motion), respectively.

Therefore, according to the fuel injection unit for an internal combustion engine of the present disclosure, it is possible to improve PN by using both of MPI and GDI, inhibit or prevent fuel wall-wetting, improve fuel efficiency, and reduce EM by modulating VCM and VTS and positioning MPI behind VTS.

Further, an MPI+VTS+GDI system can be achieved in a compact structure, so design can be less restricted, the operation speed is increased in comparison to the mechanical type by driving VCM with a motor, and combustion can be stably performed by mapping an engine with exact prediction of the point of time where tumble starts increasing.

Further, it is possible to reduce a loss of fuel and accurately control fuel according to the amount of air by using a plurality of MPD injectors having relative small capacity.

Although the present disclosure was described with reference to specific forms shown in the drawings, it is apparent to those skilled in the art that the present disclosure may be changed and modified in various ways without departing from the scope of the present disclosure.

What is claimed is:

1. A fuel injection unit for an internal combustion engine, the fuel injection unit comprising:
   a separator disposed in an intake port configured to supply air into a combustion chamber formed in an engine head, the separator configured to divide a channel for air into an upper channel and a lower channel;
   a blade disposed ahead of the separator, and configured to open or close the upper channel or the lower channel by rotating about a rotary shaft that is disposed on an inner wall surface of the intake port and lower than the separator;
   a first injector disposed over the intake port; and
   a second injector arranged below the intake port and configured to inject fuel directly into the combustion chamber,
   wherein when the first injector injects fuel, the blade does not interfere with the fuel,
   wherein a first end of the blade is coupled to the rotary shaft,
   wherein a second end of the blade opens the upper channel and the lower channel when the second end contacts to the inner wall, and the blade closes the lower channel when the blade rotates toward the separator, and
   wherein the first injector is in a form of a combined multiple injectors that have smaller capacity than a capacity of the first injector in a form of a single injector to accurately control fuel according to an amount of air without a loss of fuel when the combined multiple injectors are used.

2. The fuel injection unit of claim 1, wherein a rear end of the separator is positioned behind an end of the first injector.

3. The fuel injection unit of claim 1, wherein the separator and the blade is integrally provided in the intake port.

4. The fuel injection unit of claim 1, wherein the first injector is disposed in the engine head.

5. The fuel injection unit of claim 1, wherein a valve angle of the engine head is a predetermined value or less such that the first injector is disposed in the intake port.

6. The fuel injection unit of claim 1, wherein an avoiding groove is formed at an end of the separator to avoid interference with the first injector when fuel is injected.

7. The fuel injection unit of claim 1, wherein a plurality of avoiding grooves are formed at an end of the separator to avoid interference with the combined multiple first injectors when fuel is injected.

8. The fuel injection unit of claim 1, wherein the rotary shaft is connected to a driving unit and rotated by the driving unit.

9. The fuel injection unit of claim 1, wherein when the blade opens the lower channel, the blade forms a surface contact with the inner wall surface of the intake port so as to inhibit interference with the air flowing into the combustion chamber.

* * * * *